(12) United States Patent
Wright et al.

(10) Patent No.: US 8,915,590 B2
(45) Date of Patent: Dec. 23, 2014

(54) CONTACT LENS WITH HALO EFFECT

(75) Inventors: Dawn D. Wright, St. Augustine, FL (US); Jeffrey H. Roffman, Saint Johns, FL (US); Angie Bowers, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 13/475,725

(22) Filed: May 18, 2012

(65) Prior Publication Data
US 2013/0308091 A1 Nov. 21, 2013

(51) Int. Cl.
*G02C 7/04* (2006.01)
*G02C 7/02* (2006.01)

(52) U.S. Cl.
CPC .............. *G02C 7/021* (2013.01); *G02C 7/049* (2013.01)
USPC .................... 351/159.24; 351/159.3

(58) Field of Classification Search
CPC ......... G02C 7/046; G02C 7/049; G02C 7/021
USPC ........................... 351/159.24–159.32
See application file for complete search history.

(56) References Cited

U.S. PATENT DOCUMENTS

| | | | |
|---|---|---|---|
| 5,057,578 A | 10/1991 | Spinelli | |
| 5,314,960 A | 5/1994 | Spinelli et al. | |
| 5,371,147 A | 12/1994 | Spinelli et al. | |
| 5,414,477 A | 5/1995 | Jahnke | |
| 7,246,903 B2 | 7/2007 | Bowers et al. | |
| 7,832,860 B2 | 11/2010 | Thomas et al. | |
| 2005/0001978 A1* | 1/2005 | Ocampo | 351/162 |
| 2005/0237482 A1 | 10/2005 | Jubin et al. | |
| 2006/0050232 A1 | 3/2006 | Dukes et al. | |
| 2011/0187992 A1 | 8/2011 | Bowers et al. | |
| 2013/0093994 A1 | 4/2013 | Ando et al. | |

FOREIGN PATENT DOCUMENTS

WO   WO 2011/161920   12/2011

OTHER PUBLICATIONS

Funky Edit Wholesale Limited: Bullseye Eye Accessories, XP002703341, www.editwholesale.com/products/wholesale-bullseye-contact-lens.pair.cfm (retrieved Jul. 17, 2013).

European Search Report dated Jul. 17, 2013 for Application No. EP13168440.9.

* cited by examiner

*Primary Examiner* — Darryl J Collins

(57) ABSTRACT

A contact lens with a central portion, an iris portion, and a peripheral portion disposed about the iris portion; an effect band in or just outside the iris portion helps to provide the lens with a halo effect when worn on eye.

24 Claims, 2 Drawing Sheets

CONTACT LENS WITH HALO EFFECT

BACKGROUND

Contact lenses can be colored or tinted to provide a variety of effects to the appearance of the eye. This can be done to correct a problem with the appearance of the eye or for other cosmetic purposes. Enhancements of a particular aspect of one's appearance or even one's overall appearance are possible. However, it is challenging to produce lenses for this purpose without also introducing some unnatural aspect to the eye's appearance. The lenses and methods of this invention provide such enhancements while presenting a natural appearance.

SUMMARY OF THE INVENTION

This invention is directed to contact lenses that provide a halo effect. With this halo effect, eyes can be given an enhanced appearance by making the overall eye or the iris appear larger, more colored, more multifarious, more defined, or more youthful all in a natural manner.

The invention is a contact lens with a central portion, an iris portion disposed about the central portion, a limbal ring disposed about the iris portion and a peripheral portion disposed about the limbal ring. The central portion is clear. The iris portion has a transparent, translucent or opaque colored or tinted cosmetic pattern and partly covers a portion of the wearer's natural sclera. The portion over the wearer's natural sclera creates an effect band having different color or textural characteristics from those of the rest of the iris portion. The limbal ring is transparent, translucent or opaque colored or tinted. The inner diameter of the limbal ring partly covers a portion of the outer diameter of the iris or there is no overlap and the inner diameter of the limbal ring is greater than the outer diameter of the iris portion. The effect band, in concert with the other portions of the lens, provides a halo effect. The halo effect appears at the outer edge of the wearer's natural iris or limbus but interior with respect to the limbal ring.

In another aspect, the invention is a contact lens with the central and iris portion having a transparent or translucent colored or tinted cosmetic pattern that partly covers a portion of the wearer's natural sclera. The portion over the wearer's natural sclera creates an effect band having different color or textural characteristics from those of the rest of the iris portion. The limbal ring is transparent, translucent or opaque colored or tinted. The inner diameter of the limbal ring partly covers a portion of the outer diameter of the iris or there is no overlap and the inner diameter of the limbal ring is greater than the outer diameter of the iris portion. The effect band, in concert with the other tinted or colored portions of the lens, provides a halo effect. The halo effect is located at the outer edge of the wearer's iris portion or natural limbus but interior with respect to the limbal ring of the lens.

In another aspect, the invention is a contact lens with a clear central and iris portion. The limbal ring is transparent, translucent or opaque colored or tinted. The inner diameter of the limbal ring is greater than the outer diameter of the wearer's iris or natural limbus. The limbal ring and the wearer's iris or limbus creates an effect band having different color or textural characteristics from those of the rest of the iris portion. This effect band, in concert with the other tinted or colored portion of the lens, provides a halo effect. The halo effect is located at the outer edge of the wearer's natural iris or limbus but interior with respect to the limbal ring.

In another aspect, the invention is a contact lens with a clear or tinted central portion and no limbal ring. The iris portion is clear or has a transparent, translucent or opaque colored or tinted cosmetic pattern and partly covers a portion of the wearer's natural sclera. The portion over the wearer's natural sclera creates an effect band having different color or textural characteristics from those of the rest of the iris portion. The effect band provides a halo effect that is located at the outer edge of the wearer's iris portion or natural limbus.

In yet another aspect of the invention the effect band is lighter in color than the printed limbal ring or iris portion.

In yet another aspect of the invention the effect band is similar in color to the printed limbal ring or iris portion.

In a yet a further aspect of the invention the effect band is translucent, transparent or opaque.

In a yet a further aspect of the invention the limbal ring is translucent, transparent or opaque.

In a yet further aspect of the invention the effect band covers a portion of the sclera of the wearer.

In a yet further aspect of the invention the effect band can be created in a single or greater number of print applications.

DETAILED DESCRIPTION

The lenses of the invention have a cosmetic pattern that enhances the appearance of the eye of the person wearing the lens. In particular they provide a halo effect. A "halo effect" is an enhancement of the overall eye or iris, by making it appear larger, more defined, or multifarious in each case by virtue of the interplay of the coloration and/or texture of the natural iris, natural limbus and natural sclera together with the coloration, texture, and/or size of the printed iris pattern and or printed limbal ring. The result is achieved by a specially tinted portion of the lens that overlies an area between the outer portion of the wearer's natural iris or wearer's natural limbus and the inner portion of the printed limbal ring if present. This specially tinted portion is referred to as the "effect band" throughout this specification.

Figure 1:
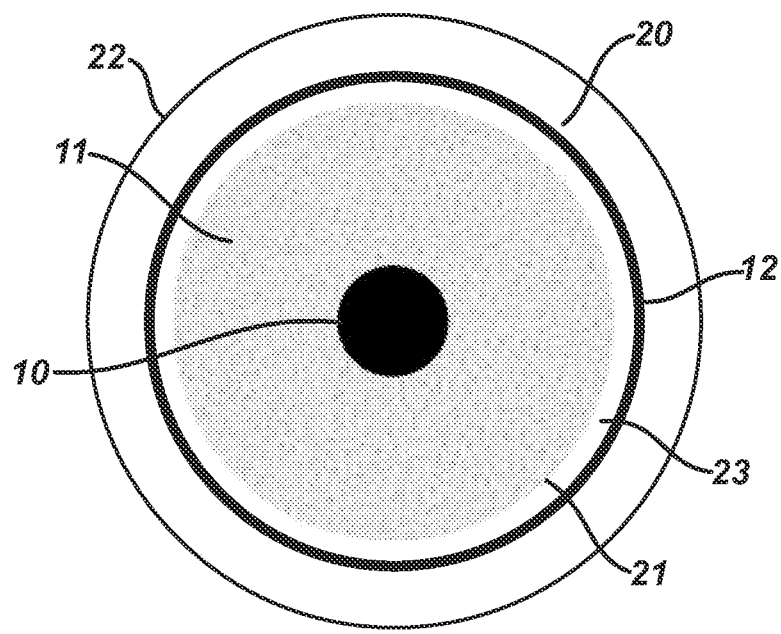
FIG. 1 is a front view of a contact lens according to the invention.

The lens shown in FIG. 1 is typically circular but can be any convenient shape for a contact lens such as an elliptical or truncated circular shape. The lens has a central portion, 10. Disposed about the central portion 10 is the iris portion, 11. Disposed about the iris portion 11, is a limbal ring, 12 and disposed about the limbal ring and extending to the surrounding edge of the lens is a peripheral portion, 20. The peripheral portion has an inner diameter, 21 and an outer diameter, 22 which can, but need not necessarily coincide with the outer edge of the lens as a whole. The effect band, 23 lies just inside the limbal ring, 12. The effect layer provides the halo effect when the lens is worn. One or more of the central portion, 10, limbal ring, 12, iris portion 11 and peripheral portion, 20 can be colored or clear or a combination of each provided they are not all clear.

The apparent size of the effect band depends on the size of the wearer's natural iris and the size of the optional limbal ring, 12. For normal, healthy eyes, the iris size range is from about 10.5 mm to about 13.0 mm and the average diameter of a pupil is generally 7 mm or less. The optional iris inner print diameter is >7 mm and the outer diameter is <14.0 mm, preferably about 12.25 mm. The limbal ring, 12 is an annular band of color that, when the lens is on-eye and centered, does not overly the lens wearers' iris or limbus, or the junction of the sclera with the cornea. That is, it is beyond the limbus, towards the peripheral portion, 20. The inner diameter of the limbal ring, 12 is thus at least 10.3 mm, preferably about 12.25 mm (provided it is greater than the outer diameter of the limbus), and extends to less than the 14.0 mm outer diameter of the peripheral portion 20. Preferably, these dimensions are measured using a millimeter ruler or a calibrated slitlamp biomicroscope. They can also be measured via image analysis or other method known to those silled in the art.

The extent of coloration or brightness of any colored or tinted portion of the lens can be measured objectively by first capturing an image of the lens with any suitable means. A conventional camera with a macro or close focusing arrangement, slit lamp biomicroscope with image capturing arrangement, or the like are all suitable tools for this purpose. The captured image is then analyzed using suitable software such as Adobe Photoshop CS4 or C55 (Adobe Systems, Inc.). In a preferred embodiment, the Color Window can be used to assess the image by, for example, using the LAB system. This has the advantage of specifying color similar to a person's normal color vision. The "L" component corresponds to lightness which ranges from 0 to 100, while the "A" and "B" components specify the color or chroma in the green-red axis and blue-yellow axis respectively. The Lab system is described elsewhere, for example, in "Photoshop_CS4_help.pdf" also published by Adobe Systems, Inc. The effect band is colored so the L component in the LAB system relative to the iris portion is brighter by about 5 or more units.

Figure 2:
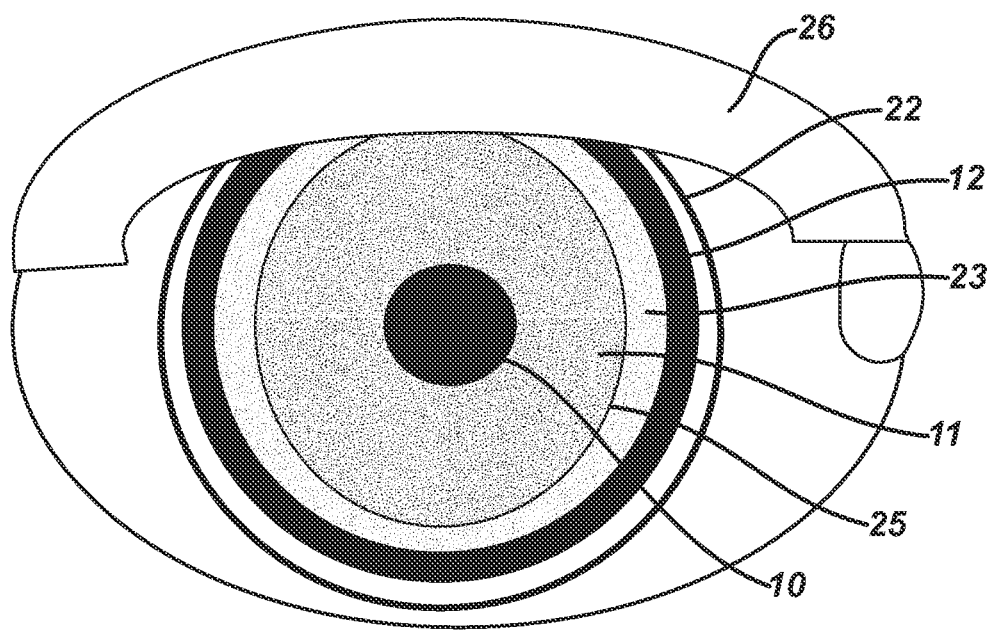
FIG. 2 is a front view of a contact lens on an eye according to the invention.

Turning to FIG. 2, the central portion, 10 (pupil portion) is clear or transparent in color or tint to allow normal vision and contains a correction for ocular ametropia if necessary. The iris portion, 11 is clear, colored, tinted or patterned to provide a cosmetic effect. The color can be transparent, translucent or opaque. If the opacity of the coloration of the iris portion, 11 is such that it would interfere with the visual acuity then the color preferably does not overlie the pupil, over which the central portion, 10, is meant to lie. However, a small overlap may occur and still be acceptable. The limbal ring, 12 extends beyond the outer circumference of the wearer's natural limbus but not so much beyond and over the sclera that it looks unnatural. The limbal ring is clear, colored, tinted or patterned. The color can be transparent, translucent or opaque. "Opaque" for these purposes means a color that permits an average light transmittance (% T) in the 380 to 780 nm range of 0 to about 50, preferably 7 to about 50% T. "Translucent" for these purposes means a color that permits an average light transmittance (% T) in the 380 to 780 nm range of about 50 to about 85%, preferably about 65 to about 85% T. In FIG. 2, the area located between the inner diameter of the limbal ring, 12 and the outer diameter of the person's natural iris or limbus, 25 is the effect band 23.

Depending upon the patterning of the printed layers, the appearance of the effect band, 23 may vary among the following: regular and smooth, irregular, jagged, or the like. Indeed the effect band can be slightly elliptical and in any case need not be symmetrical. It has dimensions which will depend upon the size of the printed patterns, and the wearer's natural eye anatomy. Printing or placing two colors on the lens results in up to 5 shaded regions when the lens is worn on the eye.

The effect band, 23 most notably contributes to the halo effect and results from a combination of the location, dimension, color and intensity/saturation of the limbal ring, the iris portion, and also the wearers' natural iris. It is similar to but slightly different than the remainder of the iris portion with respect to its color, intensity of coloration, and degree of transparency or translucency. The iris portion, 11 and effect band 23 can use the same translucent color meaning they can be a single print. The pattern can blend with other visible structures of the wearer's natural iris since they are not completely covered by the pattern. U.S. Pat. No. 7,832,860 provides one such example of this type of pattern and is incorporated herein by reference. Most preferably, the placement and intensity of the effect band, 23 are such that they blend with the natural sclera to produce a slightly lighter or less intensely colored portion of the lens. In a preferred embodiment, the eye enhancing effect is visible to the normal eye or the eye with corrected vision at a distance of 5 feet or less, more preferably 3 feet or less. If the iris portion, 11 is opaque, then the effect band 23 simply enlarges the appearance of the overall iris as worn. This makes the iris region appear larger or better defined, even larger than a pattern with a colored lens and limbal ring alone.

In one embodiment, the halo effect makes the eye look bigger when using an opaque or translucent color in the iris portion 11, with or without a limbal ring, 12. In another embodiment, the halo effect resembles light naturally reflecting off of the surface of the eye. In another embodiment, the halo effect makes only the iris portion of the eye appear larger. In another embodiment, the halo effect makes the natural iris portion of the eye appear even larger than with a limbal ring, 12 only.

The type of pattern of the design in either or both the iris portion, 11 or the effect band, 23 can also contribute to the halo effect. Incorporating dots in either is one effective way of achieving an effective blend of hues and color intensities in both the effect band and the iris portion. As described below, the halo effect can also be influenced by the type of pigment or tint and the manner in which it is applied.

The peripheral portion of the lens, 20 can be transparent, opaque, translucent, or somewhere between the two (semi-opaque). It is not necessary that it be uniformly colored either but embodiments according to the invention enhance its appearance, preferably, by providing the sclera with a refreshed, natural appearance.

Preferably both the iris portion and the limbal ring are patterned in a similar fashion as in U.S. Pat. No. 7,246,903 but with the dimensions as described herein. This patent is incorporated herein by reference. Such patterning optionally includes substantially triangular-shaped structures that resemble spokes in a wheel extending inwardly from the innermost portion of the effect band toward the geometric center of the lens. The tapered spokes may, but preferably do not, extend over the entire iris portion of the lens, meaning the portion of the lens that overlies the iris when the lens is on-eye and centered.

Contact lenses of this invention may be stabilized. This can be accomplished with any of the well-known stabilization approaches for rotational stabilization. For example, a stabilization design that is a useful starting point is described in US Patent Publication 20050237482 which is incorporated herein by reference but any stabilization design can be used.

In general, the colored elements may be made from any organic or inorganic pigment suitable for use in contact lenses, or combinations of such pigments. The opacity may be controlled by adding titanium dioxide and/or varying the concentration of the pigment, with higher amounts of pigment yielding greater opacity. Illustrative organic pigments include, without limitation, pthalocyanine blue, pthalocyanine green, carbazole violet, vat orange #1, and the like and combinations thereof. Examples of useful inorganic pigments include, without limitation, iron oxide black, iron oxide brown, iron oxide yellow, iron oxide red, titanium dioxide, and the like, and combinations thereof. In addition to these pigments, soluble and non-soluble dyes may be used including, without limitation, dichlorotriazine and vinyl sulfone-based dyes. Liquid crystal additives may also be used to create various effects. Useful dyes, pigments and additives are commercially available.

The dye or pigment selected may be combined with one or more of a pre-polymer, or binding polymer, and a solvent to form the colorant used to produce the transparent, translucent and opaque layers used in the lenses of the invention. Other additives useful in contact lens colorants also may be used. The binding polymers, solvents, and other additives useful in the color layers of the invention are known and either commercially available or methods for their making are known.

The elements may be applied to, or printed on, one or more surfaces of a lens or may be printed onto one or more surfaces of a mold into which a lens forming material will be deposited and cured. In a preferred method for forming lenses incorporating the designs of the invention, a thermoplastic optical mold, made from any suitable material including, without limitation, cyclic polyolefins and polyolefins such as polypropylene or polystyrene resin is used. The elements are deposited onto the desired portion of the molding surface of the mold. By "molding surface" is meant the surface of a mold or mold half used to form a surface of a lens. Preferably, the deposition is carried out by pad printing as follows.

A metal plate, preferably made from steel and more preferably from stainless steel, is covered with a photo resist material that is capable of becoming water insoluble once cured. The plate can also be made of ceramic materials. The elements are selected or designed and then reduced to the desired size using any of a number of techniques such as photographic techniques, placed over the metal plate, and the photo resist material is cured.

The plate is subsequently washed with an aqueous solution and the resulting image is etched into the plate to a suitable depth, for example about 20 microns. Alternately, the pattern can be applied to the plate by means of laser ablation or cavitation.

A colorant containing a binding polymer, solvent, and pigment or dye is then deposited onto the elements to fill the depressions with colorant. A silicone pad having a geometry suitable for use in printing on the surface and varying hardness, generally about 1 to about 10, is pressed against the image on the plate to remove the colorant and the colorant is then dried slightly by evaporation of the solvent. The pad is then pressed against the molding surface of an optical mold. A complementary mold half is then used to complete the mold assembly and the mold assembly is exposed to conditions suitable to cure the lens material used. Such conditions are well known in the art and will depend upon the lens material selected. Once curing is completed and the lens is released from the mold, it is equilibrated in a buffered saline solution.

In a preferred embodiment, a clear, pre-polymer layer is used, which pre-polymer layer overlays the pigmented region and preferably forms the entirety or a portion of the lens' outermost surface. It is also possible to apply the cosmetic patterns of this invention by means of ink jet printing. The ink jet printing may be applied to a clear pre-polymer layer or directly to the surface of a lens mold.

The invention may be used to provide tinted hard or soft contact lenses made of any known optical design, including non-corrective (piano), spherical, toric or multifocal designs. The invention may also be used to provide tinted hard or soft contact lenses made of any known lens-forming material, or material suitable for manufacturing such lenses. Preferably, the lenses of the invention are soft contact lenses, the material selected for forming the lenses being any material suitable for producing soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the lens is made from a material containing a siloxane functionality, including, without limitation, polydimethyl siloxane macromers, methacryloxypropyl polyalkyl siloxanes, and mixtures thereof, a silicone hydrogel or a hydrogel made of monomers containing hydroxy groups, carboxyl groups, or both and combinations thereof. Materials for making soft contact lenses are well known and commercially available. Preferably, the lens material is acquafilcon, etafilcon, genfilcon, lenefilcon, balafilcon, lotrafilcon, or galyfilcon. The lens may be further enhanced by using additives in the packing solution. An example of such an additive is polyvinylpyrollidine.

The invention is further described in the following nonlimiting examples.

EXAMPLE 1

Clear Base Ink Composition Preparation

A binding polymer was made using 96 g of 1-dodecanethiol ("DODT"), 56.54 g lauryl methacrylate ("LMA"), 7.40 g methacrylic acid ("MAA"), 1367 g of hydroxyethylmethacrylate ("HEMA"), 68.5 g glycerol, 378 g 1-ethoxy-2-propanol ("EP"), 1511 g isopropyl lactate ("IPL") and 8.89 g 2,2'-azobis(2-methylbutyronitrile) ("AMBN"). First adding the DODT, monomers and solvents, except for about 50-100 cc of the IPL, were mixed in a 5 liter blue cap bottle and stirred for 10 minutes. The mixture was then poured into a 5 L stainless steel reactor with stirrer and nitrogen. The mixture was stirred and heated for approximately 25 min. until the temperature was 68° C. After the temperature was stabilized at 68° C., the AMBN was dissolved in the remaining IPL and added while opening the nitrogen bleed. The polymerization was allowed to proceed for 16-24 hours after which the temperature was increased to 80° C. and the reaction was completed. The mixture was then allowed to equilibrate to room temperature. The viscosity of the mixture was adjusted as desired by mixing 4 parts of IPL with 1 part of EP.

EXAMPLE 2

Black Limbal Ink Preparation

A black pad printing ink was prepared by weighing 53.12 g. of primary black (comprised of 33.21 wt % black iron oxide pigment $FeO.Fe_2O_3$, CAS #12227-89-3) in clear base (as described in Example 1) into a 250 mL glass jar. 96.88 g. of clear base (described in Example 1) and 6 wt % 1-propanol was also added to the jar. The jar was placed under a mixer and mixed at 1800 rpm until the appearance of the ink was homogenous.

EXAMPLE 3

Iris Ink Preparation

A green pad printing ink was prepared by weighing 13.95 g. of primary green (comprised of 6.45 wt % phthalocyanine green pigment $C_{32}HCl_{14}CuN_8$ CAS #1328-53-6) in clear base (as described in Example 1) into a 250 mL glass jar. 136.05 g of clear base (described in Example 1) and 6 wt % 1-propanol was also added to the jar. The jar was placed under a mixer and mixed at 1800 rpm until the appearance of the ink was homogenous.

EXAMPLE 4

Iris Ink Preparation

A green and yellow pad printing ink was prepared by weighing 74.88 g primary HT yellow (comprised of 25% yellow iron oxide pigment $Fe_2O_3.H_2O$ CAS #51274-00-1) 6.98 g. of primary green (comprised of 6.45 wt % phthalocyanine green pigment $C_{32}HCl_{14}CuN_8$ CAS #1328-53-6) and 0.26 g primary yellow (comprised of 28.74 wt % yellow iron oxide pigment $Fe_2O_3.H_2O$ CAS #51274-00-1) in clear base (as described in Example 1) into a 250 mL glass jar. 68.12 g. of clear base (described in Example 1) and 6 wt % 1-propanol was also added to the jar. The jar was placed under a mixer and mixed at 1800 rpm until the appearance of the ink was homogenous.

EXAMPLE 5

Iris Ink Preparation

A blue, yellow and white printing ink was prepared by weighing 2.13 g. primary blue (comprised of 6.45 wt % phthalocyanine blue pigment $C_{32}H_{16}CuN_8$ CAS #147-14-8), 2.44 g. of primary HT yellow (comprised of 25% yellow iron oxide pigment $Fe_2O_3.H_2O$ CAS #51274-00-1) and 10.01 g. of primary white (comprised of 30 wt % titanium dioxide white pigment $TiO_2$ CAS #13463-67-7) in clear base (as described in Example 1) into a 250 mL glass jar. 135.38 g. of clear base (described in Example 1) and 6 wt % 1-propanol was also added to the jar. The jar was placed under a mixer and mixed at 1800 rpm until the appearance of the ink was homogenous.

EXAMPLE 6

Lens Fabrication with Cosmetic Pattern having an Effect Band (Prophetic)

A concave mold part and a convex mold part is injection molded, from polystyrene, in ambient conditions (21% oxygen, 25° C.). The concave mold part is placed into a dry nitrogen tunnel inside the pad printer (approximately 180 seconds). The concave curves are pad printed, at 0.5% oxygen, first with a 15 μm deep full circle (14.50 mm OD) clear base ink composition (described in example 1) and then with a 20 μm black ink composition (described in example 2). The limbal ring 12 can be that of FIG. 1 with an OD of about 14.0 mm and an ID of 12.0 mm. The final print is with a 20 μm deep iris portion 11 ink composition (described in Examples 3, 4 or 5). The pattern can be that of FIG. 1 with an OD of 12.25 mm and an ID of 7.80 mm. The mold is then returned to ambient conditions (21% oxygen, 25° C.) for approximately 20 seconds. The concave and convex curves are reconditioned at 2.8% oxygen for approximately 70 seconds. The printed concave mold part is then charged with 73 mg of etafilcon A reactive monomer mixture. The convex mold part is placed on top of the dosed reactive monomer mix and is subjected to precure weights (~200 grams) to ensure proper mold closure. The assemblies with precure weights are placed in a precure tunnel at 25° C. for 75 seconds with no lights to allow the monomer to penetrate the printed layers. The precure weights are removed and the curves are then placed in a curing tunnel with a controlled temperature (70° C.) and light intensity (370 to 440 nm) for about 4 minutes. The closed assembly is demolded and the lens is removed from the mold and any uncured monomers or dilutes are leached from the lens by immersion in DI Water and Tween combination at 70° C. (+/−5) for a minimum of 60 minutes. The lens is then equilibrated in a buffered saline solution, packaged and sterilized.

The result is a cosmetic lens with a limbal ring 12 who's inside diameter is slightly larger than the average natural iris size. This limbal layer 12 is a translucent black. The iris portion 11 extends from the limbal layer 12 towards the pupil region 10 and does not cover the pupil region 10. The iris portion 11 is comprised of colorants that are translucent or transparent and cover the scleral area between the printed limbal ring 12 and the person's natural iris. This printed iris portion 11 will naturally be lighter due to the blending of the person's natural white sclera and the translucent or transparent printed iris portion 11. The resulting effect is a dark limbal with a lighter halo effect band around the iris and then a color region over all or part of the natural iris. When worn on eye, the wearer's eye looks larger and more multifarious than without the lens.

We claim:

1. A contact lens comprising a central portion, a tinted iris portion positioned about the central portion, a limbal ring positioned about the iris portion, a peripheral portion about the limbal ring, and an effect band positioned between the iris portion and the limbal ring, the limbal ring comprising an annual band of color that, when the contact lens is on eye and centered, does not overly the wearer's iris or limbus or the junction of the sclera with the cornea, the effect band blends with the natural sclera of a wearer's eye thereby producing a less intensely colored portion of the contact lens and giving an appearance of a larger iris, the effect band differing from the iris portion in at least one of color, intensity of coloration and degree of transparency or translucency and the limbal ring.

2. The lens of claim 1 wherein the central portion is transparent.

3. The lens of claim 1 wherein the central portion is translucent.

4. The lens of claim 1 wherein the tinting in the iris portion is in the form of a pattern.

5. The lens of claim 1 wherein the effect band is a different hue from that of the iris portion.

6. The lens of claim 1 wherein the effect band comprises a tinting which is of a different intensity relative to the tinting in the iris portion.

7. The lens of claim 1 wherein the effect band comprises a tinting which is of a different texture than that of the tinting in the iris portion.

8. The lens of claim 1 wherein the effect band is translucent.

9. The lens of claim 1 wherein the effect band is transparent.

10. The lens of claim 1 wherein the effect band is opaque.

11. The lens of claim 1 wherein the iris portion is translucent.

12. The lens of claim 1 wherein the iris portion is transparent.

13. The lens of claim 1 wherein the limbal ring is translucent.

14. The lens of claim 1 wherein the limbal ring is transparent.

15. The lens of claim 1 wherein the limbal ring is opaque.

16. The lens of claim 1 wherein the tinting in the iris portion is discontinuous.

17. The lens of claim 1 wherein the tinting in the iris portion is continuous.

18. The lens of claim 1 wherein the outer circumference of the limbal ring is in a position on the lens that would overlie the sclera of the lens wearer.

19. The lens of claim 1 wherein the inner circumference of the limbal ring is in a position on the lens that would overlie the sclera of the lens wearer.

20. The lens of claim 1 wherein the effect band comprises an irregular circumference.

21. A method of manufacturing a contact lens comprising a central portion, a tinted iris portion positioned about the central portion, a limbal ring positioned about the iris portion, a peripheral portion positioned about the limbal ring, and a tinted effect band positioned between the wearer's natural iris and the limbal ring, the limbal ring comprising an annual band of color that, when the contact lens is on eye and centered, does not overly the wearer's iris or limbus or the junction of the sclera with the cornea, the effect band blending with the natural sclera of a wearer's eye to produce a less intensely colored portion of the contact lens, the effect band differing from the iris portion in at least one of color, intensity of coloration and degree of transparency or translucency and the limbal ring wherein the tinted iris portion, limbal ring, and effect band are printed or lithographed.

22. The method of claim 21 wherein tinting is applied by pad printing.

23. The method of claim 21 wherein tinting is applied by ink jet printing.

24. The method of claim 21 wherein tinting is applied by photolithography.

* * * * *